United States Patent [19]

Marriott Turner

[11] 3,928,770

[45] Dec. 23, 1975

[54] FILM CASSETTE

[75] Inventor: George Frederick Albert Marriott Turner, Ilford, England

[73] Assignee: Ilford Limited, England

[22] Filed: Aug. 19, 1974

[21] Appl. No.: 498,541

[52] U.S. Cl. .................. 250/481; 250/475; 250/482
[51] Int. Cl.² ............................................ G03C 5/16
[58] Field of Search ........... 250/468, 469, 475, 481, 250/482

[56] References Cited
UNITED STATES PATENTS

| | | | |
|---|---|---|---|
| 2,878,389 | 3/1959 | Raffman | 250/481 |
| 3,499,147 | 3/1970 | Goodman et al. | 250/481 |
| 3,784,835 | 1/1974 | Schmidt | 250/482 |
| 3,842,282 | 10/1974 | Shimoda et al. | 250/481 |

*Primary Examiner*—James W. Lawrence
*Assistant Examiner*—B. C. Anderson
*Attorney, Agent, or Firm*—Wenderoth, Lind & Ponack

[57] ABSTRACT

An X-ray film cassette which comprises (a) a rectangular base member consisting of a flat base plate which has on three sides upstanding walls having thereon inwardly directed horizontal flanges, (b) a cover member held in position on the base member which consists of a flat plate which has on three sides upstanding walls having thereon outwardly directed horizontal flanges, the dimension of both the base member and the cover member being so chosen that the flanges on the cover member can slide under the flanges on the base member to hold the cover member in the base member, (c) resilient means located between the base plate of the base member and the horizontal flanges of the cover member for holding the cover member in the raised position so that the horizontal flanges on the cover member abut the horizontal flanges on the base member, (d) means located in the base member enabling the cover member to be held with its flanges adjacent to the base plate of the base member when the cover member is pushed down against the resilient means to enable the cassette to be closed, (e) means for releasing the cover member so that it can return to the raised position, (f) means for rendering light-tight the side of the cassette which is not covered by an upstanding wall on the base member and (g) means for retaining an X-ray film firmly in position in the cassette when the cassette is in the closed position.

11 Claims, 11 Drawing Figures

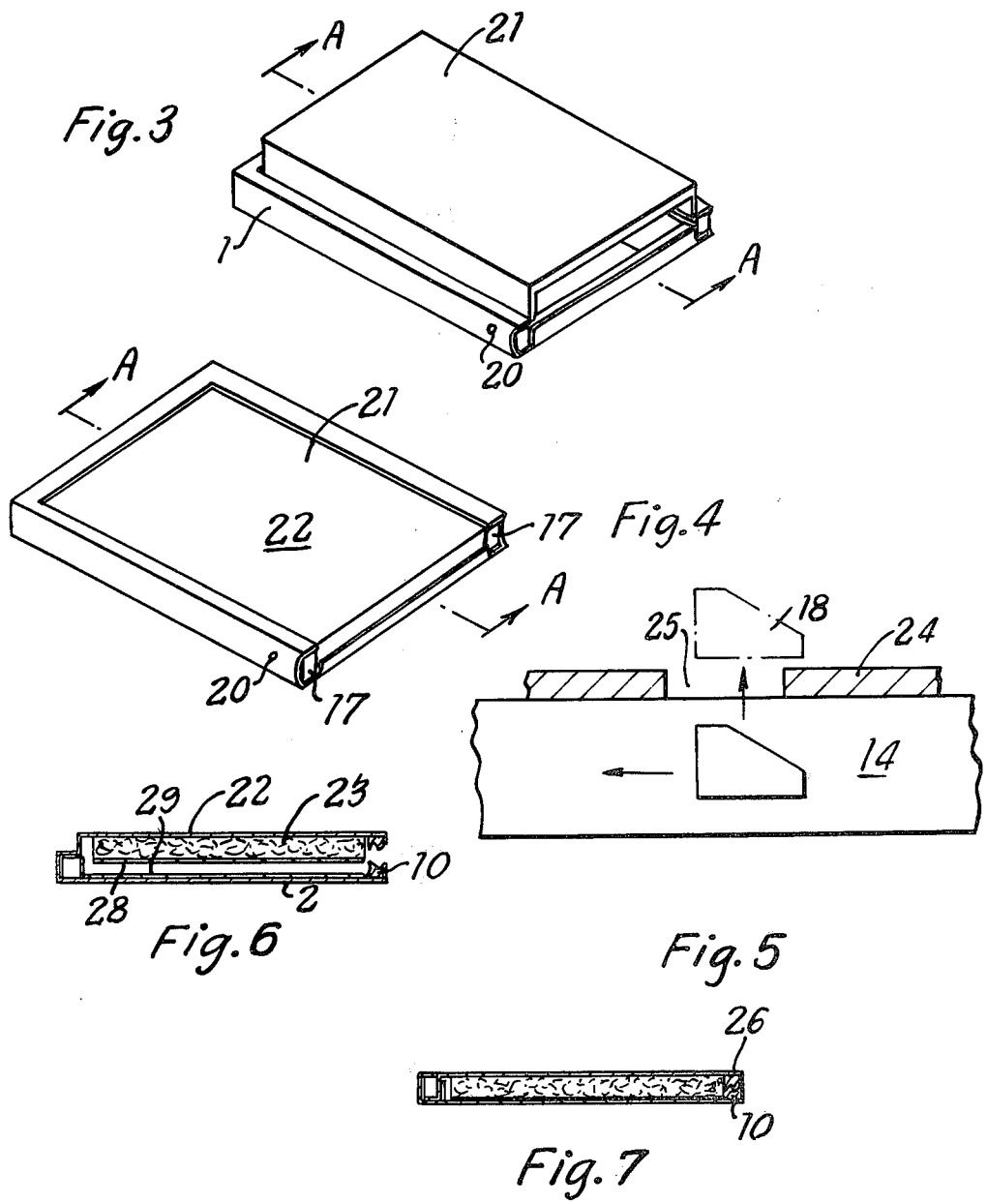

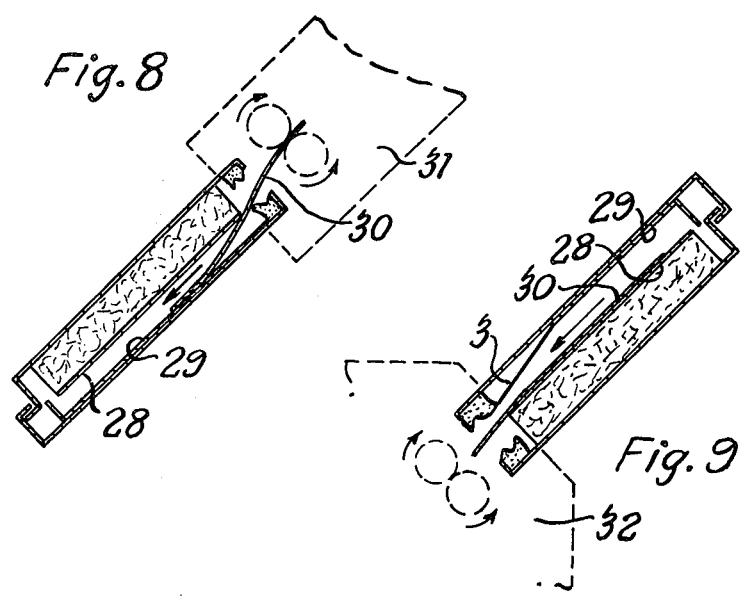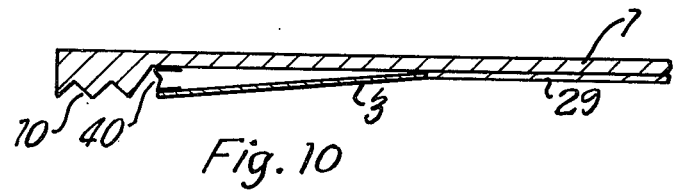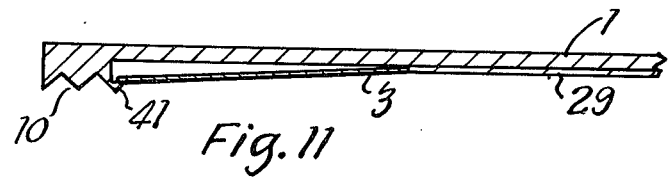

FILM CASSETTE

This invention relates to X-ray film cassettes.

Most X-ray film cassettes consist of a thin light-tight six sided box in which the X-ray film to be exposed is sandwiched between two intensifying screens which must be in close uniform contact with the film at the time of exposure. When a cassette is loaded it must be possible to separate the two intensifying screens sufficiently so that the X-ray film may be inserted therebetween without the film being scratched or buckled.

It is the object of the present invention to provide an X-ray film cassette which has a sufficiently large open-to-closed travel when opening or shutting the cassette to enable an X-ray film to be inserted easily in the cassette without the film being buckled or scratched and which can be loaded or unloaded in the daylight by use of an automatic film loader and film processor.

According to the present invention there is provided an X-ray film cassette which comprises (a) a rectangular base member consisting of a flat base plate which has on three sides upstanding walls having thereon inwardly directed horizontal flanges, (b) a cover member held in position on the base member which consists of a flat plate which has on three sides upstanding walls having thereon outwardly directed horizontal flanges, the dimension of both the base member and the cover member being so chosen that the flanges on the cover member can slide under the flanges on the base member to hold the cover member in the base member, (c) resilient means located between the base plate of the base member and the horizontal flanges of the cover member for holding the cover member in the raised position so that the horizontal flanges on the cover member abut the horizontal flanges on the base member, (d) means located in the base member enabling the cover member to be held with its flanges adjacent to the base plate of the base member when the cover member is pushed down against the resilient means to enable the cassette to be closed, (e) means for releasing the cover member so that it can return to the raised position, (f) means for rendering light-tight the side of the cassette which is not covered by an upstanding wall on the base member and (g) means for retaining an X-ray film firmly in position in the cassette when the cassette is in the closed position.

Preferably the resilient means are leaf springs mounted either on the base plate of the base member or on the horizontal flanges of the cover member.

Preferably the means for holding the flanges of the cover member adjacent to the base plate comprise locking members located adjacent the two side walls of the base plate which face each other, there being corresponding apertures in the horizontal flanges of the cover member so that when the cover member is pushed down against the resilient means the locking members are forced through the apertures and partially lap over the horizontal flanges on the cover members so closing the cassette.

Preferably the said locking members are present on the side arms of a U-shaped locking device which consists of two side arm members joined by a bow-spring member, each of these three members being located under the overhanging flanges of the base plate, the two side arm members being connected to the corresponding side walls of the base member in such a way that they can be moved in a horizontal direction to a limited extent, for example by means of a rivet attached to the side wall which rivet moves in a slot on the corresponding side arm member of the locking device. The bow-spring is attached to the two side-arm members of the locking device so that when the cover member is pushed down on the locking members on the side arms of the locking device the bow-spring is depressed slightly enabling the locking device to come through the corresponding apertures on the horizontal flanges of cover member thus enabling the locking members to hold down the cover member against the resilient means and enable the cassette to be closed. When they are pushed against the resistance of the bow-spring the side arms move horizontally and release the cover member from the locking members if the cassette is in the closed position. The resilient members raise the cover member to the raised or cassette open position as soon as the locking device releases the cover member. Preferably the bow-spring attached to the side arms is notched at each end at least to the thickness of the flanges on the cover member. When the cover member is pushed down the notched ends of the bow-springs cover the end corners of the flanges on the cover member and thus help to retain the cover member against the base plate.

Preferably the X-ray film is retained on the base plate of the base member within four shallow walls mounted on the base plate. More preferably resilient means are provided inside the cassette which fit inside the four shallow walls and press against an X-ray film retained within the four shallow walls when the cassette is in the closed position. Most preferably this resilient means is secured to the underside of the plate of the cover member. Conveniently the resilient means is of an expanded plastics material or felt. A portion of this material is shaped to fit into the four shallow walls on the base plate and is secured by an adhesive to the underside of the cover member.

Preferably the means for rendering the open side of the cassette light tight are overlapping flanges mounted both on the base member and on the cover member. However in one embodiment the overlapping flange on the base member is combined with one wall of the four shallow walls which locate the X-ray film on the base plate.

In practice there is usually an X-ray screen secured to the base plate and the X-ray film lies on top on this screen. Also there is an X-ray screen secured to the resilient means mounted on the underside of the cover member so that the X-ray film is sandwiched between the two screens when the cassette is closed.

The X-ray film cassette of the present invention has a large open-to-close travel when the cassette is opened or shut and this enables the X-ray films to be inserted into the cassette or removed easily without the film being buckled or scratched. The X-ray film cassette of the present invention when in the open position is still light-tight along three sides of the cassette. Thus the fourth side of the cassette, i.e. the cassette opening can be inserted into an automatic loading apparatus, the cassette opened while in the loading apparatus the film loaded therein in the daylight. Similarly the X-ray cassette of the present invention containing an X-ray film can be inserted in the mouth of the X-ray film processing apparatus and the film unloaded from the cassette by inserting the cassette into the mouth of the processor in the upside-down position, opening the cassette and allowing the film to slide out of the cassette by gravity. However an X-ray film present in a cassette of the present invention sometimes does not slide out of the cassette as readily as is desirable and therefore according to another embodiment of the present invention there is provided an X-ray film cassette of the type hereinbefore described wherein an X-ray film is located within the confines of four shallow walls located on the base plate of the cassette there being located on the base plate a hingeable member which is either at least a portion of an X-ray intensifying screen or a metal plate co-planar with the intensifying screen the said member being hingeably attached to the base plate so that when the cassette is turned over so that the bottom side of the base plate faces substantially in an upward direction and the cassette is opened the end of the hingeable member which is not hinged falls away from the base plate on which it rests.

Preferably the hingeable member is a lead plate coplanar with the intensifying screen. The lead plate acts as a mask which prevents exposure of all the X-ray film, the unexposed portion of the film being used to record details, for example, of patient in a previous or subsequent exposure to the main X-ray exposure.

Preferably the end of the hingeable member which falls away from the base plate when the cassette is inverted and opened is allowed to fall from the base plate only through a limited distance. This distance may be regulated, by for example attaching to that end of the hingeable member which falls away from the base plate a tie member or by providing an abutment member incorporated on one of the shallow walls which confine the X-ray film and against which the free end of the hingeable member abuts when it falls away from the base plate.

In the cassette of the present invention when the loaded X-ray cassette is inverted and opened the free end of the hingeable member falls down by gravity from the base plate so causing the X-ray film below it to be removed from the confines of the four shallow walls. Most preferably the hingeable member is a lead plate located in one of the two corners of the cassette nearest the opening of the cassette.

The nomenclature employed in describing an X-ray film cassette is apt to be a little confusing in that the base plate member of the cassette is usually exposed directly to the X-rays and thus this face is sometimes called the front of the cassette. However in describing the cassette of the present invention the base member is the member on which the X-ray film rests, it is being separated from a cover by a resilient pad.

Thus, the X-ray cassette of the present invention can easily be opened by hand and loaded or unloaded with film. Furthermore the cover member of the X-ray cassette can easily be removed from the bottom member thus enabling the intensifying screens in the cassette or the resilient pad on the cover member to be replaced.

The accompanying drawings will serve to illustrate a preferred embodiment of the X-ray cassette of the present invention.

FIG. 3 is the X-ray film cassette of FIG. 1 with the component parts in position; the X-ray cassette being in the open position.

FIG. 4 is the X-ray cassette of FIG. 1 with the component parts in position; the X-ray cassette being in the closed position. Line AA is shown.

FIG. 5 is a portion of the X-ray cassette of FIG. 1 showing how the cassette is retained in the closed position.

FIG. 6 is a section along line AA showing cassette in the open position.

FIG. 7 is also a section along line AA showing the cassette in the closed position.

FIG. 8 shows how the cassette of FIG. 1 may be loaded in the daylight by means of an automatic loading apparatus.

FIG. 9 shows how the cassette of FIG. 1 may be unloaded in the daylight in an automatic processing apparatus.

FIGS. 10 and 11 show in greater detail methods for arresting the fall of the hingeable plate.

Figure 1:
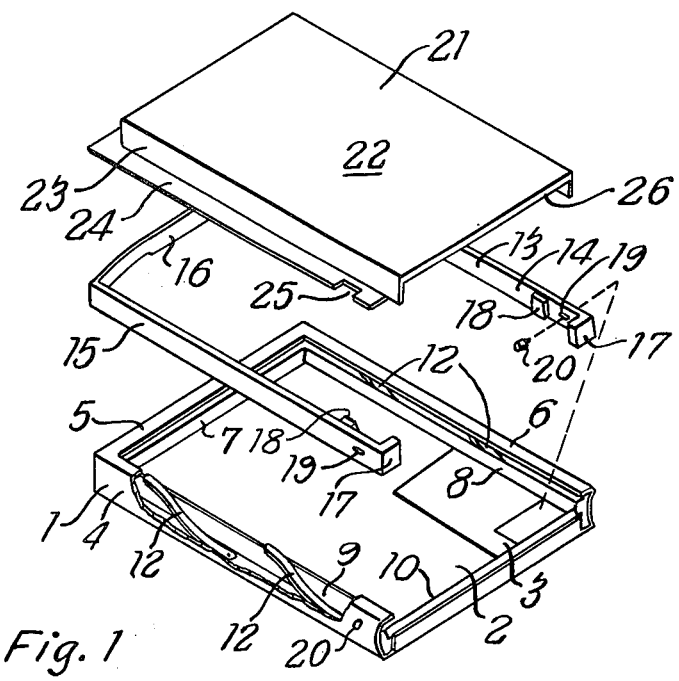
FIG. 1 is an exploded view of the components of an X-ray film cassette.

In FIG. 1 an X-ray cassette comprises a base member 1 having a base plate 2 which has on it a hingeable lead plate 3 and three upstanding side walls 4, 5 and 6, these side walls terminating in inwardly directed horizontal flanges. Inside these side walls 4, 5 and 6 mounted on the base plate are shallow walls 7, 8, 9 and 10. The shallow wall 10 is in fact a modified wall designed to co-act with a similar shaped wall on the cover member to render the cassette light-tight and as shown in FIG. 4 it has a modified inner lip. Placed between the upstanding walls 4 and 6 and the shallow walls 8 and 9 are four leaf springs 12. Above the base member 1 is shown the locking device 13. This device comprises two side arms 14 and 15 which are joined together by a notched bow-spring 16. The ends of the arms 14 and 15 terminate in releasing members 17. Mounted on the inside of each arm 14 and 15 is a locking member 18. Between the locking member 18 and the releasing member 17 are slots 19. A rivet 20 shown diagramatically in this figure secures the locking member 13 to the base member 1 it being located in the slot 19 (another rivet not shown secures the locking member to the base member through the other slot 19). Above the locking member 13 is the cover member 21. This consists of a plate 22 having three upstanding side walls 23 (only one of which is visible in this figure). The extremities of the three side walls 23 terminate in a outwardly directed horizontal flanges 24. On the two horizontal flanges 24 which face each other there is present an aperture 25. On the fourth side of the plate 22 there is present a flange 26 which is so shaped to co-act with the shallow wall 10 (of the base member) to render the cassette light-tight when it is closed.

The locking device 13 is placed under the flanges of the side walls 4, 5 and 6 resting on base plate 2 and secured to the base member 1 by means of the rivets 20 which are located in the slots 19. The flanges 24 of the cover member 21 are slid under overhanging flanges of the side walls 4, 5 and 6 of the base member 2. The resilient springs 12 hold the cover member 21 in the cassette open position at which position the flanges 24 of the cover member 21 abut the flanges of the side walls 4, 5 and 6. This position is shown in FIG. 3.

When the cover member 21 is pressed down the bow spring 16 is depressed lightly and the locking members 18 pass through apertures 25. When the travel of the cover member 4 is complete, the side arms 14 and 15 move to a small extent horizontally thus causing the locking members 18 to overlap slightly the flanges 24 and the notched ends of the bow-spring 16 to overlap the two end corners of the flange 24. This closes the cassette. This closed position is shown in FIG. 4.

Figure 2:
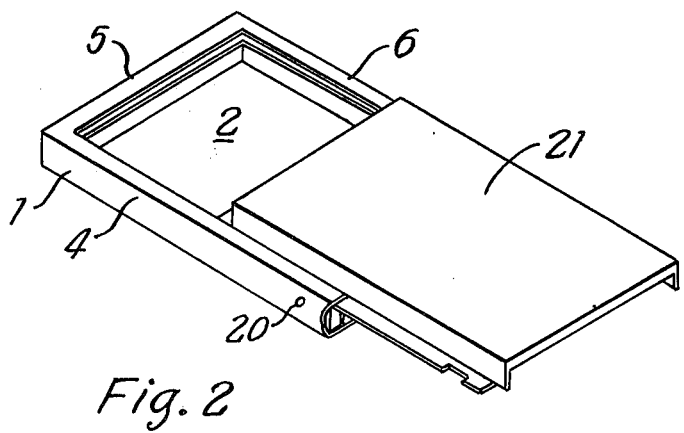
FIG. 2 is the X-ray film cassette of FIG. 1 showing the cover portion being slid over the base portion.

In order to open the cassette the releasing members 17, which are shown in FIGS. 2 and 3, are depressed slightly. This causes the side arms 14 and 15 of the locking device to move horizontally against the pressure of the bow-spring 16. This brings the locking members 18 into register with the aperture 25 and the springs 12 then force the cover member to the open position thus opening the cassette.

FIG. 5 shows in detail how the locking members 18 pass through the apertures 25 and how the bottoms of the locking members overlap slightly the flanges 24.

In FIGS. 6–11 the numbers have the same significance as in FIG. 1.

In FIG. 6 there is shown mounted on the underside of the plate 22 a pad 23 of felt to which is attached an X-ray intensifying screen 28. An X-ray intensifying screen 29 is secured to the base plate 2 of the base member 1. When the X-ray cassette is to be loaded the releasing members 17 are depressed and the X-ray cassette assumes the open position with the cover member held in the raised position by the leaf springs 12. In this position there is a comparatively wide gap between the top cover 21 and the base plate 2 as shown in FIG. 4. Through this gap an X-ray film may be inserted so that it lies on the top of the X-ray intensifying screen 29 secured to the base plate 2. The X-ray cassette may then be closed by pressing the cover member 21 down against the base member 1. This forces the resilient pad 23 having the X-ray screen 28 attached into the shallow walls 7, 8, 9 and 10 located on the base member 2 thus sandwiching the X-ray film between the two intensifying screens. The cassette is rendered light-tight by the member 26 on the cover member 21 co-acting with the end wall 10 to form a light-tight seal as shown in FIG. 7. End wall 10 has a modified lip which serves to arrest the hingeable flap 3 which falls down when the cassette is inserted.

In FIG. 8 the cassette of FIGS. 1 to 4 is shown in open position in the mouth of light-tight film loaded 31. The X-ray film 30 is loaded into the cassette and the cassette is then closed by the automatic loader.

When the X-ray film 30 has been exposed the cassette may be turned upside down and inserted into an automatic processor 32 as shown in FIG. 9. When the X-ray cassette is inserted into an automatic processor, the automatic processor opens the cassette and the film 30 slides by gravity out of the cassette into the processor being urged out of the surrounding walls by the hingeable flap 3 dropping away. The hingeable flap 3 is arrested by the lip on the shallow wall 10.

In FIG. 10 the lead plate 3 is tied to the base plate 2 by means of a folded strip of tape 40. One end of the folded strip 40 being attached to the base plate 2 and the other end to the lead plate 3.

In FIG. 11 the shallow wall 10 of the cassette has been so modified to form an abutment member 41. When the lead plate 3 falls away from the base plate 2 the distance of travel is limited by its end stopping against the abutment 41. This is the embodiment shown in FIGS. 6–8.

What we claim is:

1. An X-ray film cassette which comprises (a) a rectangular base member consisting of a flat base plate which has on three sides upstanding walls having thereon inwardly directed horizontal flanges, (b) a cover member held in position on the base member which consists of a flat plate which has on three sides upstanding walls having thereon outwardly directed horizontal flanges, the dimension of both the base member and the cover member being so chosen that the flanges on the cover member can slide under the flanges on the base member to hold the cover member in the base member, (c) resilient means located between the base plate of the base member and the horizontal flanges of the cover member for holding the cover member in the raised position so that the horizontal flanges on the cover member abut the horizontal flanges on the base member, (d) means located in the base member enabling the cover member to be held with its flanges adjacent to the base plate of the base member when the cover member is pushed down against the resilient means to enable the cassette to be closed, (e) means for releasing the cover member so that it can return to the raised position, (f) means for rendering light-tight the side of the cassette which is not covered by an upstanding wall on the base member and (g) means for retaining an X-ray film firmly in position in the cassette when the cassette is in the closed position.

2. An X-ray film cassette according to claim 1 wherein the resilient means (c) are leaf springs mounted either on the base plate of the base member or on the horizontal flanges of the cover member.

3. An X-ray film cassette according to claim 2 wherein the means (d) for holding the flanges of the cover member adjacent to the base plate comprise locking members located adjacent the two side walls of the base plate which face each other, there being corresponding apertures in the horizontal flanges of the cover member so that when the cover member is pushed down against the resilient means the locking members are forced through the apertures and partially lap over the horizontal flanges on the cover members so closing the cassette.

4. An X-ray film cassette according to claim 3 wherein the said locking members are present on the side arms of a U-shaped locking device which consists of two side arm members joined by a bow-spring member, each of these three members being located under the overhanging flanges of the base plate, the two side arm members being connected to the corresponding side walls of the base member in such a way that they can be moved in a horizontal direction to a limited extent.

5. An X-ray film cassette according to claim 4 wherein each of the two side arm members are connected to the corresponding side walls of the base member by means of a rivet attached to the side wall, which rivet moves in a slot on the corresponding side arm member of the locking device.

6. An X-ray film cassette according to claim 5 wherein the said bow-spring attached to the side arms is notched at each end at least to the thickness of the flanges on the cover member.

7. An X-ray film cassette according to claim 1 wherein the means (g) for retaining the film in position in the cassette are four shallow walls mounted on the base plate together with resilient means attached to the cover member of the cassette and which fits inside the four shallow walls when the cassette is closed.

8. An X-ray film cassette according to claim 1 wherein the means (f) for rendering the open side of the cassette light-tight are overlapping flanges mounted both on the base member and on the cover member.

9. An X-ray film cassette according to claim 7 wherein there is located on the base plate a hingeable member which is either at least a portion of an X-ray intensifying screen or a metal plate co-planar with the intensifying screen the said member being hingeably attached to the base plate so that when the cassette is turned over so that the bottom side of the base plate faces substantially in an upward direction and the cassette is opened the end of the hingeable member which is not hinged falls away from the base plate on which it rests.

10. An X-ray cassette according to claim 9 wherein the hingeable member is a lead plate.

11. An X-ray cassette according to claim 9 wherein means are provided in the cassette for ensuring that the hingeable plate falls only through a limited distance.

* * * * *